United States Patent
Enthaler et al.

(10) Patent No.: US 10,442,299 B2
(45) Date of Patent: Oct. 15, 2019

(54) HIGH-VOLTAGE BATTERY FOR A MOTOR VEHICLE, AND MOTOR VEHICLE

(71) Applicant: AUDI AG, Ingolstadt (DE)

(72) Inventors: Achim Enthaler, Ingolstadt (DE); Benjamin Hasmüller, Affing (DE)

(73) Assignee: AUDI AG, Ingolstadt (DE)

( * ) Notice: Subject to any disclaimer, the term of this patent is extended or adjusted under 35 U.S.C. 154(b) by 132 days.

(21) Appl. No.: 15/543,605

(22) PCT Filed: Jan. 13, 2016

(86) PCT No.: PCT/EP2016/050555
§ 371 (c)(1),
(2) Date: Jul. 14, 2017

(87) PCT Pub. No.: WO2016/113298
PCT Pub. Date: Jul. 21, 2016

(65) Prior Publication Data
US 2018/0001775 A1 Jan. 4, 2018

(30) Foreign Application Priority Data
Jan. 16, 2015 (DE) .................. 10 2015 000 593

(51) Int. Cl.
*H02J 7/00* (2006.01)
*H02J 7/14* (2006.01)
(Continued)

(52) U.S. Cl.
CPC ............ *B60L 11/1816* (2013.01); *B60L 3/04* (2013.01); *B60L 8/003* (2013.01); *B60L 50/64* (2019.02);
(Continued)

(58) Field of Classification Search
CPC ......... H04B 3/548; Y02B 20/346; H02J 4/00; H02J 50/40; H02J 9/02; H02J 1/102;
(Continued)

(56) References Cited

U.S. PATENT DOCUMENTS 6,323,608 B1 * 11/2001 Ozawa .................. B60K 6/28
318/139
9,370,992 B2 * 6/2016 Holmes .................. B60K 6/485
(Continued)

FOREIGN PATENT DOCUMENTS

DE 696 04 239 T2 12/1999
DE 10 2011 107 269 A1 1/2013
(Continued)

OTHER PUBLICATIONS

Notification of Transmittal of Translation of the International Preliminary Report on Patentability dated Jul. 27, 2017, in connection with corresponding international application No. PCT/EP2016/050555 (7 pgs.).

(Continued)

*Primary Examiner* — Nghia M Doan
(74) *Attorney, Agent, or Firm* — Maier & Maier, PLLC

(57) ABSTRACT

A high-voltage battery for a motor vehicle, the operating voltage of which is greater than 12 V, in particular, greater than 50 V, having two power connections at a high-voltage network power system of the motor vehicle, which can be connected without voltage through first safety contactors provided inside a housing of the high-voltage battery, and storage cells for electrical energy that are connected to the power connections via the first safety contactors. The high-voltage battery additionally has two charging terminals, which are connected to the storage cells by circumventing the first safety contactors by way of charging lines.

8 Claims, 2 Drawing Sheets

(51) Int. Cl.
  *B60L 11/18*  (2006.01)
  *B60L 3/04*   (2006.01)
  *B60L 8/00*   (2006.01)
  *B60L 53/14*  (2019.01)
  *B60L 53/22*  (2019.01)
  *B60L 58/18*  (2019.01)
  *B60L 58/20*  (2019.01)
  *B60L 50/60*  (2019.01)
  *B60L 50/64*  (2019.01)

(52) U.S. Cl.
  CPC ............... *B60L 50/66* (2019.02); *B60L 53/14* (2019.02); *B60L 53/22* (2019.02); *B60L 58/18* (2019.02); *B60L 58/20* (2019.02); *H02J 7/0031* (2013.01); *H02J 7/0055* (2013.01); *B60L 2210/14* (2013.01); *Y02T 10/7005* (2013.01); *Y02T 10/7066* (2013.01); *Y02T 10/7072* (2013.01); *Y02T 10/7083* (2013.01); *Y02T 10/7225* (2013.01); *Y02T 90/127* (2013.01); *Y02T 90/14* (2013.01)

(58) Field of Classification Search
  CPC ........ H02J 2009/068; H02J 3/006; H02J 9/00; H02J 9/06
  USPC .................................................. 320/101–102
  See application file for complete search history.

(56) References Cited

U.S. PATENT DOCUMENTS

| | | | |
|---|---|---|---|
| 9,444,285 B2* | 9/2016 | Kamiya | H02J 7/35 |
| 10,106,038 B2* | 10/2018 | Jiang | B60L 11/1853 |
| 2002/0130643 A1* | 9/2002 | Binder | H02H 3/202 |
| | | | 323/267 |
| 2012/0028085 A1* | 2/2012 | Wurth | H01M 2/34 |
| | | | 429/7 |
| 2013/0092457 A1 | 4/2013 | Wecker et al. | |
| 2014/0091619 A1* | 4/2014 | Yoshimi | B60L 58/12 |
| | | | 307/10.1 |

FOREIGN PATENT DOCUMENTS

| | | |
|---|---|---|
| DE | 10 2012 219 313 A1 | 5/2013 |
| DE | 10 2013 209 954 A1 | 12/2013 |
| EP | 2 255 990 A1 | 12/2010 |
| EP | 2 276 100 A2 | 1/2011 |
| WO | 2013/092064 A2 | 6/2013 |

OTHER PUBLICATIONS

Examination Report dated Oct. 16, 2015 of corresponding German application No. 10 2015 000 593.6; 5 pgs.
International Search Report and Written Opinion dated Mar. 30, 2016 of corresponding application No. PCT/EP2016/050555; 13 pgs.

\* cited by examiner

HIGH-VOLTAGE BATTERY FOR A MOTOR VEHICLE, AND MOTOR VEHICLE

FIELD

The invention relates to a high-voltage battery for a motor vehicle, the operating voltage of which is greater than 12 V, in particular, greater than 50 V, having two power connections at a high-voltage network power system of the motor vehicle, which can be connected without voltage through first safety contactors provided within a housing of the high-voltage battery, and storage cells for electrical energy that are connected to the power connections via the first safety contactors. In addition, the invention relates to a motor vehicle having such a high-voltage battery.

BACKGROUND

Modern motor vehicles, particularly electric vehicles and hybrid vehicles, for the most part, have two on-board power networks, namely a low-voltage power system, for example of 12 V, and a high-voltage power system, the supply voltage of which is higher than that of the low-voltage power system. The low-voltage power system is supplied by a low-voltage battery, for example a 12 V lead battery (and optionally other energy sources such as an alternator), whereas its own high-voltage battery is provided in the high-voltage power system, which can be charged in a different way. If an electric motor is present, it can function as a generator and charges the high-voltage battery via the power connections thereof. In the case of electric vehicles and in the case of so-called plug-in hybrid vehicles, a charging device is provided, which permits charging up the high-voltage battery also from an electrical energy source that is external to the motor vehicle, for example, at a charging station.

Since the high voltage frequently exceeds the contact safety voltage, safety measures are necessary in order to be able to produce an absence of voltage in the high-voltage power system of the motor vehicle. A portion of these measures include first safety contactors that are provided within the high-voltage battery and that can be connected via a pilot line, for example, as is basically known in the prior art. Of course, a control device may also be present, for example, as a part of a battery management system or to create such a system, by way of which the first safety contactors can be closed or engaged and opened or disengaged. A specified power is usually necessary in order to keep the first safety contactors engaged, since these contactors must satisfy high requirements. In order to increase safety, a passive discharge resistor that is connected for the most part external to the battery between the positive and the negative power connections is also required by law in some countries.

It has already been proposed to permit an exchange of energy between the low-voltage power system and the high-voltage power system, so that it is also conceivable, in particular, to charge the high-voltage battery via energy sources of the low-voltage power system. For this purpose, a d.c. voltage transformer, in particular a bidirectional d.c. voltage transformer, which makes possible this energy exchange, can be connected between the low-voltage power system and the high-voltage power system.

It has also recently been proposed to integrate solar devices in motor vehicles, in particular as a sun roof, as another electrical energy source in motor vehicles. Such solar devices have at least one solar cell, which permits it to transform sunlight into electrical energy. During operation of the motor vehicle, the solar device can support operation in the low-voltage power system; when the motor vehicle is not in operation, i.e., in a non-operating state or a non-operating phase, it has been proposed to use the energy obtained from the solar device also for charging the low-voltage battery. Of course, low-voltage batteries, particularly the usual 12 V lead batteries, do not have a very large storage capacity, so that the total amount of energy that the solar device produces cannot be stored, in particular with longer down times of the motor vehicle. On the other hand, however, the power available from the solar device is rather small, so that a charging of the high-voltage battery by way of the power connections and a d.c. voltage transformer designed for supplying the low-voltage power system from the solar device has only a very low efficiency, if it is possible at all, for example, since the first safety contactors would have to be kept open or disengaged, and if need be, additional different components would have to be actively operating. Further, the mentioned passive discharge resistor represents a load via the power connections of the high-voltage battery during the charging process. Another problem relative to the charging of the high-voltage battery from the solar device in today's motor vehicles is that the high-voltage power system would still be under voltage even in a non-operating phase of the motor vehicle, which is not desired.

SUMMARY OF THE DISCLOSURE

The object of the invention is thus to provide a configuration of a high-voltage battery that makes possible an improved charging process, in particular without the necessity of a high voltage on the high-voltage power system of the motor vehicle.

In order to achieve this object, for a high-voltage battery of the type named initially, it is provided according to the invention that the battery additionally has two charging terminals that are connected to the storage cells via charging lines, while circumventing the first safety contactors.

It is therefore proposed to provide, in addition to the network power connections at the high-voltage battery, an additional pair of connections or terminals that are dedicated for charging the high-voltage battery, circumventing the power connections and particularly the disengaged first safety contactors during the charging process, and thus a particularly provided passive discharge resistor between the power connections is also circumvented. Therefore, if the storage cells are connected to the power connections by way of corresponding power lines, in which the first safety contactors are connected, then these power lines bump into the charging lines that are exiting from the charging terminals and that, of course, can also contain additional components of the high-voltage battery, whereby, as will be detailed further below, the charging lines meet the power lines on the side of the first safety contactors that faces away from the power connections. In other words, the charging lines are connected to the storage cells "behind" the first safety contactors. In this way, the first safety contactors can remain open or disengaged during the charging process, so that the entire high-voltage network also remains without voltage. This offers advantages for the efficiency of the charging process, since the first safety contactors need not be supplied with current, wherein the passive discharge also represents no load during the charging process by way of the passive discharge resistor that is connected between the power connections.

Due to the fact that the high-voltage power system remains free of voltage during the non-operating phase of the motor vehicle in which the high-voltage battery will be charged, the high-voltage safety of the motor vehicle increases overall. The inactive high-voltage power system also permits a higher efficiency in the charging process.

The additional two charging terminals are used with particular advantage for charging from an energy source with a lower output voltage than the operating voltage of the high-voltage battery, in particular from a solar device or in general from the low-voltage power system of the motor vehicle. It is thus possible by way of the configuration of the high-voltage battery to provide an efficient charging of the high-voltage battery through solar energy, which offers a protection from deep discharging of the high-voltage battery, provides an additional range without cost with sufficient solar radiation for motor vehicles having an electric motor, and permits a complete utilization of the energy obtained through the solar device, since high-voltage batteries make available a very high storage capacity.

The additional charging terminals that circumvent the high-voltage power system and the first safety contactors thus serve finally for minimizing loss. It is proposed to supply energy into the battery from behind the internal first safety contactors, which makes possible for the first time a meaningful utilization of a solar device for charging the high-voltage battery.

An appropriate enhancement of the invention provides that at least one second safety contactor is provided in the charging lines connecting the charging terminals to the storage cells, in particular, directly connecting to the storage cells and outside a common line segment of the charging lines having network power lines connecting the power connections to the storage cells. Fewer requirements would be placed on these types of safety measures relative to the charging terminals, especially if the charging activity takes place at lower power from a low-voltage energy source, such as a solar device. The second safety contactors can thus be designed so that they require a clearly lower power in order to be maintained in a closed or engaged state. Nevertheless, sufficient safety is present.

In this case, it is appropriate if the at least one second safety contactor, in particular when a second safety contactor is provided in each charging line, whereby this will be detailed further below, is connected via a pilot line guided through a d.c. voltage transformer. As in the case of the first safety contactors, a pilot line can thus be provided, wherein the pilot line provided for the second safety contactors passes through a required d.c. voltage transformer when charging is produced from an energy source of lower voltage, in particular a solar device. If the transformer is not present/is defective, the second safety contactors are automatically opened or disengaged.

An appropriate embodiment in connection with second safety contactors provides that a common control device of the high-voltage battery is provided for the control of the operation of the first safety contactors and the at least one second safety contactor. It is appropriate to situate the function for opening or disengaging the first and the second safety contactors in the same control device, in particular, in the same electronic control unit, so that upon recognizing an error (for example, over-charging of the high-voltage battery or also if the motor vehicle is involved in an accident), all safety contactors can be securely opened or disengaged. Another increase of safety in the motor vehicle with respect to the high-voltage supply is ensured thereby.

In a particularly preferred embodiment of the present invention, it can be provided that a d.c. voltage transformer for transforming a charging voltage applied at the charging terminals, which is in particular lower than the operating voltage of the high-voltage battery, into a d.c. voltage stored for charging the storage cells, is also provided in the housing of the high-voltage battery. This means then, if the high-voltage battery is to be charged from an energy source with lower voltage, for example a solar device, a d.c. voltage transformer is necessary, which can also be integrated into the high-voltage battery, more precisely inside a housing of the high-voltage battery, and this has special advantage within the scope of the present invention. However, this means that only the low charging voltage, for example, at a level of 12 V, need be applied at the charging terminals. This further contributes to an increased safety at the high-voltage battery, since the high voltage is produced only within the housing of the high-voltage battery by the integrated d.c. voltage transformer, preferably with galvanic isolation.

Appropriately, the high-voltage battery can have a control device or the control device that is also designed for controlling the operation of the d.c. voltage transformer. In this case in particular, the control device may be the one that also jointly controls first and second safety contactors. Whereas the control logic for controlling the charging power by way of the d.c. voltage transformer can be appropriately integrated into the control device of the high-voltage battery, it is also conceivable, of course, to position it in another way, for example, as a part of a battery management system or as part of its own electronic control unit.

It can be provided that the d.c. voltage transformer is designed to operate bidirectionally. Such an embodiment is then particularly appropriate, if electrical energy is to be guided outwardly also via the d.c. voltage transformer by way of the charging terminals, for example, for charging a battery in the low-voltage power system and/or for supporting a consumer in the low-voltage power system. In this context, two second safety contactors are then appropriately provided in each case, since a separation or isolation would be carried out on both charging lines in order to increase safety. A corresponding pilot line can then be guided by way of the internal d.c. voltage transformer.

In particular, when the internal d.c. voltage transformer is provided as a charging d.c. voltage transformer, which will introduce only incoming electrical energy by way of the charging terminals for charging the storage cells to a higher voltage level, the safety measures can also be configured in another way in order to reduce requirements, in particular, for a single second safety contactor, if it is provided at all. Thus, in a preferred embodiment of the invention, it can be provided that a diode and/or a fuse that prevents the flow of electrical energy in the direction of the charging terminals is connected in at least one charging line. This embodiment can also be realized if the d.c. voltage transformer is provided outside the high-voltage battery. Such a diode in the final analysis assures that a discharge of the high-voltage battery by way of the output circuit of the d.c. voltage transformer cannot occur. However, if a short circuit should occur via the output circuit of the d.c. voltage transformer, whether it is internal or external, the fuse would be triggered and the power connection would be terminated in this way.

If a second safety contactor is also provided in this embodiment, it is present as an additional redundancy for disconnecting the charging lines, for example, in order to fulfill a corresponding safety requirement. A second safety contactor is, however, additionally meaningful also with respect to a possible overcharging of the high-voltage battery.

As has already been mentioned, the additional charging terminals permit a charging process of the high-voltage battery independently from the high-voltage power system, so that it can also be stated that a control device or the control device controlling the charging of the high-voltage battery by way of the charging terminals is designed for charging the high-voltage battery when the first safety contactors are opened or disengaged.

In addition to the high-voltage battery, the invention also relates to a motor vehicle having a high-voltage battery connected to a high-voltage power system, the voltage of which is higher than the voltage of a low-voltage power system of the motor vehicle. All of the embodiments relative to the high-voltage battery can be transferred analogously to the motor vehicle according to the invention, with which the already named advantages can also therefore be obtained.

In this case, in a particularly advantageous embodiment of the motor vehicle according to the invention, it is provided that a d.c. voltage transformer that is external to the high-voltage battery and is connected to the charging terminals of the high-voltage battery is provided in the motor vehicle, or a d.c. voltage transformer is integrated in the high-voltage battery, wherein a low voltage suitable for the charging the low-voltage battery of the low-voltage power system and/or for supplying consumers of the low-voltage power system is introduced as the charging voltage to the d.c. voltage transformer on the side facing away from the storage cells. As has already been presented, the d.c. voltage transformer can thus be provided external to the high-voltage battery, but also can be integrated into the latter, whereby it is certainly conceivable to also use a bidirectional d.c. voltage transformer. In particular, however, if a unidirectional d.c. voltage transformer will be used, this means that the charging terminals actually serve only for charging the high-voltage battery from an energy source with a lower charging voltage than the operating voltage of the high-voltage battery. In any case, as also applies to the high-voltage battery according to the invention, the d.c. voltage transformer is preferably designed so that a galvanic isolation results ("galvanically isolated d.c. voltage transformer").

As was already mentioned, the present invention offers special advantages in connection with charging possibilities of the high-voltage battery via a solar device of the motor vehicle, so that in a preferred embodiment, the motor vehicle can additionally have a solar device comprising at least one solar cell, and this device provides the charging voltage. Whereas it was previously not possible in a meaningful way in terms of energy to charge a high-voltage battery via a solar device, in the scope of the present invention, the power is sufficient to keep the first safety contactors opened or disengaged and not enough to provide an additional load of the discharge resistor.

BRIEF DESCRIPTION OF THE DRAWINGS

Additional advantages and details of the present invention result from the examples of embodiment described in the following, as well as based on the drawings. Here.

DETAILED DESCRIPTION

Figure 1:
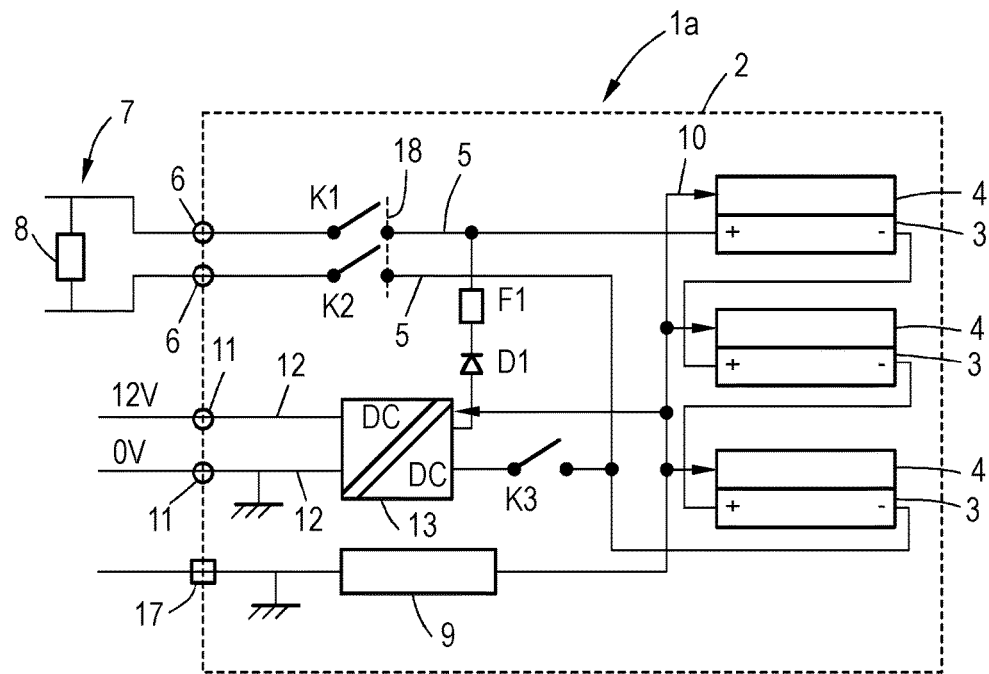
FIG. 1 shows a first embodiment of a high-voltage battery according to the invention.

FIG. 1 shows a schematic diagram of a first exemplary embodiment of a high-voltage battery 1a according to the invention. This battery comprises a housing 2, which is only outlined here, in which a plurality of storage cells 3 (battery modules/cells) are arranged, three of which are shown here. A storage module control unit 4 is assigned to each of the storage cells. The storage cells 3 are connected in series under one another, and joined by way of power lines 5 with power connections 6, and can be connected by way of the high-voltage battery 1a to a high-voltage power system 7 of the motor vehicle, which is only roughly indicated here; and only the passive discharge resistor 8 of this system 7 is shown for purposes of illustration.

In order to be able to reliably isolate the high-voltage battery 1a from the high-voltage power system 7, two first safety contactors K1 and K2 are provided in the power lines 5, which require a specific power, for example 5 watts in each case, in order to remain in the closed or engaged state. Although this is not shown in detail here for reasons of presenting an overview, the first safety contactors K1, K2, can be controlled by way of a central control device 9 of the high-voltage battery 1a; a pilot line 18 can be additionally provided, which opens or disengages the contactors K1, K2, for example, always when the high-voltage battery 1a is not connected to the high-voltage power system 7.

The central control device 9 is designed here as a battery management control unit, which, as indicated by the internal communication line 10, also controls the control units 4 of the storage cells.

In addition to the power connections 7*, the high-voltage battery 1a, however, also has charging terminals 11. The charging terminals 11 permit a low-voltage energy source, in particular a solar device of the motor vehicle, to be connected for charging the storage cells 3 at the high-voltage battery 1a, which is illustrated by way of the voltage values shown in FIG. 1. Therefore, the energy input via the charging terminals 11 will be guided to the storage cells 3 by means of charging lines 12 by way of several components, which will be explained in more detail in the following, and is done, in fact, by circumventing the first safety contactors K1 and K2. This means that in fact a common line segment of power lines 5 and charging lines 12 is present, but the charging lines 12 first meet in this segment the portions of the power lines 5 joining the first safety contactors K1, K2 to the storage cells 3 connected in series to these lines.

In order to transform the clearly lower charging voltage, which lies at 12 V here, into a d.c. voltage suitable for charging the storage cells 3, a galvanically isolating d.c. voltage transformer 13 is also presently integrated in the housing 2 of the high-voltage battery 1a, which is therefore incorporated in the charging lines 12.

As safety measures on the high voltage side of the d.c. voltage transformer 13, there is presently provided a diode D1, a fuse F1, and a second safety contactor K3, which can be closed or engaged with a lower power than the first safety contactors K1, K2. The second safety contactor K3 serves as an additional redundancy for disconnecting the high voltage, in particular with respect to protection from overcharging. The diode D1 serves the purpose of preventing a discharge of the high-voltage battery 1a, thus of storage cells 3, by way of the output circuit of the d.c. voltage transformer 13. However, if a short circuit should occur via the output circuit of the d.c. voltage transformer 13, the fuse F1 would be triggered and thus the flow of current would be terminated.

The depicted sequence and arrangement of the components F1, D1 and K3 is selected by way of example; the components can be arranged, of course, in any desired sequence between the positive and negative poles of the storage cells 3 connected in series.

The control logic for controlling the charging process, in particular the charging power, is presently also provided in the control device 9, as is indicated by the corresponding arrow of the internal communication line 10 to the d.c. voltage transformer 13. Further, in addition to the first safety contactors K1, K2, the electronic control unit 9 also controls the second safety contactor K3, whereby, upon recognition of an error, for example, in the case of an overcharging of the high-voltage battery 1a, all safety contactors K1, K2, and K3 can be securely opened or disengaged. It should be noted here that the safety contactors can be designed as relays, but it is also entirely conceivable in future, in particular when adapting to current standards, to provide safety contactors as semiconductor switches.

In order to be able to communicate with an overriding energy management system, the control device 9 is connected to external electronic control units by way of an external communications interface 17.

Figure 2:
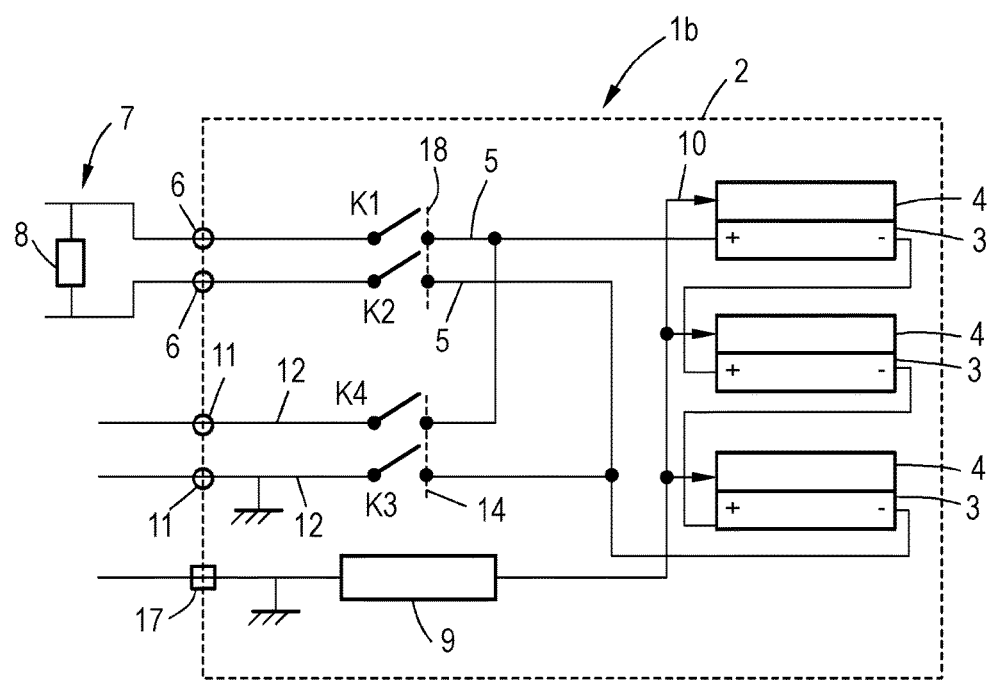
FIG. 2 shows a second embodiment of a high-voltage battery according to the invention.

FIG. 2 shows an exemplary embodiment modified in comparison to FIG. 1, which is distinguished from the exemplary embodiment of FIG. 1 in that a d.c. voltage transformer 13 is not integrated into the high-voltage battery 1b there; instead of this, however, by omitting diode D1 and fuse F1, two second safety contactors K3, K4 are provided, which in turn can be controlled by way of the control device 9, but are also coupled via a pilot line 14 to the external d.c. voltage transformer, which is not shown here. Of course, diode D1 and fuse F1 can still be optionally provided. Providing fuse F1 can be significant in the modified exemplary embodiment, if a change is present in the conductor cross section.

In both examples of embodiment of a high-voltage battery 1a, 1b, it is possible to carry out a charging process by way of an electrical energy source with low voltage, whereby the high-voltage battery 1a, 1b, is isolated from the high-voltage power system 7.

Figure 3:
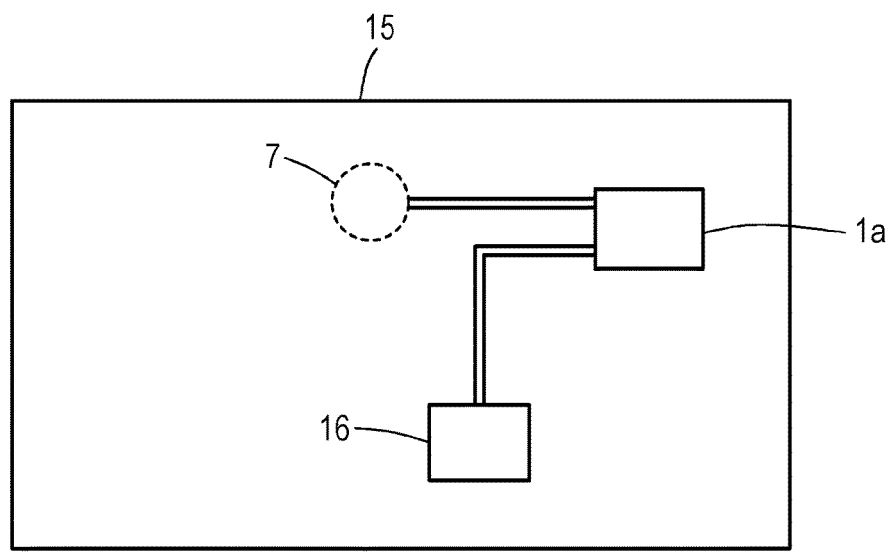
FIG. 3 shows a motor vehicle according to the invention.

FIG. 3 finally shows a schematic diagram of a motor vehicle 15 according to the invention. The vehicle presently has a high-voltage battery 1a according to the invention; a high-voltage battery 1b would require an additional external d.c. voltage transformer between the high-voltage battery 1b and the electrical energy source, which is presently designed as a solar device 16 comprising at least one solar cell. However, since the high-voltage battery 1a is used, it is possible without any problem to pass on electrical energy obtained from the solar device 16, which can be designed as a sun roof, to the high-voltage battery 1a by way of the charging terminals 11, so that it can be charged in an extremely energy-efficient manner, since the first safety contactors K1, K2 are circumvented and the discharge resistor 8 does not represent a load. The solar device 16 can be directly connected to the charging terminals 11, but it can also be connected via the low-voltage power system that is not shown in detail here.

In the last-named case, with corresponding wiring also elsewhere, other energy sources of the low-voltage power system can also charge the high-voltage battery 1a if needed.

The invention claimed is:

1. A high-voltage battery for a motor vehicle, an operation voltage of the high-voltage battery that is greater than 50 V, comprising:
    two power connections at a high-voltage network power system of the motor vehicle, wherein the high-voltage network power system of the mother vehicle can be connected without voltage through first safety contactors provided inside a housing of the high-voltage battery, and storage cells for electrical energy that are connected to the power connections via the first safety contactors,
    wherein the high-voltage battery additionally has two charging terminals, wherein the two charging terminals are connected to the storage cells by circumventing the first safety contactors by way of charging lines, and
    wherein the high-voltage network power system is separated from the charging lines if the first safety contactors are opened or disengaged.

2. The high-voltage battery according to claim 1, wherein at least one second safety contactor is provided in the charging lines connecting the charging terminals to the storage cells, the at least one second safety contractor is directly connected to the storage cells and a common line segment of the charging lines with power lines connecting the power connections to the storage cells.

3. The high-voltage battery according to claim 2, wherein the at least one second safety contactor is connected by way of a pilot line guided through a d.c. voltage transformer, and a common control device of the high-voltage battery is provided for controlling the operation of the first safety contactors and the at least one second safety contactor.

4. The high-voltage battery according to claim 1, wherein, a d.c. voltage transformer is also provided in the housing of the high-voltage battery for transforming a charging voltage that is applied to the charging terminals and that is, lower than the operating voltage of the high-voltage battery, into a d.c. voltage for charging the storage cells.

5. The high-voltage battery according to claim 4, wherein the high-voltage battery has a control device for controlling the operation of the d.c. voltage transformer.

6. The high-voltage battery according to claim 4, wherein the d.c. voltage transformer operates bidirectionally.

7. The high-voltage battery according to claim 1, wherein a diode and a fuse preventing the flow of electrical energy in the direction of the charging terminals is connected in at least one charging line.

8. The high-voltage battery according to claim 1, wherein a control device is controlling the high-voltage battery charging process via the charging terminals in the case of opened or disengaged first safety contractors.

* * * * *